(12) United States Patent
Duane et al.

(10) Patent No.: US 7,810,147 B2
(45) Date of Patent: Oct. 5, 2010

(54) DETECTING AND PREVENTING REPLAY IN AUTHENTICATION SYSTEMS

(75) Inventors: William Duane, Westford, MA (US); Lawrence N. Friedman, Arlington, MA (US); Alexander Volanis, Chelmsford, MA (US)

(73) Assignee: EMC Corporation, Hopkinton, MA (US)

( * ) Notice: Subject to any disclaimer, the term of this patent is extended or adjusted under 35 U.S.C. 154(b) by 875 days.

(21) Appl. No.: 11/607,836

(22) Filed: Dec. 1, 2006

(65) Prior Publication Data

US 2007/0256123 A1    Nov. 1, 2007

Related U.S. Application Data

(60) Provisional application No. 60/741,136, filed on Dec. 1, 2005.

(51) Int. Cl.
*G06F 7/04* (2006.01)
*G06F 15/16* (2006.01)

(52) U.S. Cl. ............ 726/9; 726/5; 726/6; 726/29; 713/169; 713/182; 709/225

(58) Field of Classification Search .......... 726/9
See application file for complete search history.

(56) References Cited

U.S. PATENT DOCUMENTS

| | | | |
|---|---|---|---|
| 6,085,320 A | 7/2000 | Kaliski | |
| 6,189,098 B1 | 2/2001 | Kaliski | |
| 6,240,184 B1 | 5/2001 | Huynh et al. | |
| 6,446,052 B1 | 9/2002 | Juels | |
| 6,460,141 B1 | 10/2002 | Olden | |
| 6,970,070 B2 | 11/2005 | Juels et al. | |
| 6,985,583 B1 | 1/2006 | Brainard et al. | |
| 7,100,049 B2 | 8/2006 | Gasparini et al. | |
| 7,111,172 B1 | 9/2006 | Duane et al. | |
| 7,197,639 B1 | 3/2007 | Juels et al. | |
| 7,219,368 B2 | 5/2007 | Juels et al. | |
| 7,228,417 B2* | 6/2007 | Roskind | 713/168 |
| 7,346,775 B2 | 3/2008 | Gasparinl et al. | |
| 7,359,507 B2 | 4/2008 | Kaliski | |
| 7,363,494 B2 | 4/2008 | Brainard et al. | |
| 7,404,087 B2 | 7/2008 | Teunen | |
| 7,543,061 B2* | 6/2009 | Kumbalimutt et al. | 709/226 |
| 7,571,489 B2* | 8/2009 | Ong et al. | 726/29 |
| 7,624,425 B1* | 11/2009 | Graves | 726/1 |
| 2004/0172535 A1 | 9/2004 | Jakobsson et al. | |

(Continued)

*Primary Examiner*—Taghi T Arani
*Assistant Examiner*—Narciso Victoria
(74) *Attorney, Agent, or Firm*—BainwoodHuang

(57) ABSTRACT

A system for detecting and preventing replay attacks includes a plurality of interconnected authentication servers, and one or more tokens for generating a one-time passcode and providing the one-time passcode to one of the authentication servers for authentication. The system includes an adjudicator function associated with each authentication server. The adjudicator evaluates a high water mark value associated with a token seeking authentication, allows authentication to proceed for the token if the high water mark evaluation indicates that the one-time passcode was not used in a previous authentication, and prevents authentication if the high water mark evaluation indicates that the one-time passcode was used in a previous authentication. The token is associated with a home authentication server that maintains a current high water mark of the token. The home authentication server validates the current high water mark on behalf of the adjudicator function evaluating the token for authentication.

16 Claims, 1 Drawing Sheet

U.S. PATENT DOCUMENTS

| | | |
|---|---|---|
| 2006/0037073 A1 | 2/2006 | Juels et al. |
| 2006/0041759 A1 | 2/2006 | Kaliski et al. |
| 2006/0174104 A1 | 8/2006 | Crichton et al. |
| 2007/0124321 A1 | 5/2007 | Szydlo |
| 2007/0174614 A1 | 7/2007 | Duane et al. |
| 2007/0256123 A1 | 11/2007 | Duane et al. |
| 2008/0028447 A1 | 1/2008 | O'Malley et al. |

* cited by examiner

DETECTING AND PREVENTING REPLAY IN AUTHENTICATION SYSTEMS

CROSS REFERENCE TO RELATED APPLICATIONS

This application claims benefit of U.S. Provisional Patent Application Ser. No. 60/741,136, filed Dec. 1, 2005.

BACKGROUND

Systems that use dynamically generated secrets (e.g., one-time passcodes) as part of an authentication process often employ multiple authenticating functions (e.g., authentication servers) to increase the efficiency of the system. For example:

Multiple authenticating functions improve scaling performance by increasing the availability of authentication services at peak access times.

Multiple authenticating functions reduce authentication burden required for any single authentication function. Typical size constraints of cryptographic databases limit the number of authentications a single authenticating function can perform per unit time.

Multiple authenticating functions also allow wider geographic use. Users that are geographically remote from an authenticating function may incur unacceptable authentication delays or timeouts due to communication latency between the user and the authenticating function. Having geographically distributed authenticating functions solves this problem.

Systems with multiple authenticating functions are vulnerable to "replay" attacks. In a replay attack, an attacker intercepts and records a one-time passcode (OTP) that a legitimate user provides to an authenticating function. The attacker then replays the intercepted one-time passcode to a different authenticating function in the network in order to procure an unauthorized authentication.

One way to mitigate such replay attacks is to keep track of the "high water mark" (HWM) associated with each token or other function (hereinafter 'token') that generates a one-time passcode. During an authentication, there is information that needs to be known to all instances of the authenticating function in order to prevent a reply attack. For example, in the case of a time-based OTP token, the time of the last successful authentication would be the HWM, and is used to assure that any future authentication requests are accepted only if the time associated with that authentication request is after the HWM. In another example, in the case of a counter-based OTP token, the counter value of the last successful authentication would be the HWM. The HWM of a time-based token is a value that identifies the most recent time of authentication associated with a particular one-time passcode generated by that time-based token.

In many cases, the HWM is simply the last login time for the token. Each time that a time-based token submits a one-time passcode to an authenticating function (i.e., the current login time), the authenticating function evaluates the HWM for that token, to determine if the passcode has already been used to authenticate through a different authenticating function. If the current login time is equal to or earlier than the HWM that token, the authenticating function denies authentication for that passcode. The current login time being earlier than the HWM indicates that the passcode has already been used.

For counter-based tokens, all authenticating functions in the network must similarly be aware of the current count for all counter-based tokens. The HWM in this case tracks the counter value for the latest successful authentication. By using the HWM it can be assured that no authentication codes associated with a counter value equal to or less than the HWM are allowed.

A problem with using the HWM concept described above to thwart replay attacks is how to disseminate the HWM information for all tokens in the system to all authenticating functions in the system. One prior art system uses a "flooding" technique, which entails propagating the HWM associated with a token to all authenticating functions in the system whenever the HWM for that token changes. This technique works adequately when the number of tokens in the system is relatively small, but becomes more unwieldy as the number of tokens increases. Thus using the flooding technique to disseminate HWM information adversely affects the ability to scale the system from a performance point of view. Further, the flooding technique makes it difficult to be certain all authenticating functions in the system have the most up-to-date HWM information.

SUMMARY OF THE INVENTION

In one aspect, the invention is a system for detecting and preventing replay attacks in an authentication network. The system includes a plurality of authentication servers interconnected through an authentication network. The system also includes one or more tokens for generating a one-time passcode, and for providing the one-time passcode to one of the plurality of authentication servers for authentication. The system further includes an adjudicator function associated with each of the plurality of authentication servers. The adjudicator function evaluates a high water mark value associated with a token seeking authentication. The adjudicator function also allows an authentication procedure to proceed for the token seeking authentication if the high water mark evaluation indicates that the one-time passcode was not used in a previous authentication transaction. The adjudicator function further prevents authentication of the token seeking authentication if the high water mark evaluation indicates that the one-time passcode was used in a previous authentication transaction. The token seeking authentication is associated with a home authentication server that maintains a current high water mark value of the token seeking authentication, and the home authentication server validates the current high water mark value on behalf of the adjudicator function evaluating the token seeking authentication.

In one embodiment, one of the plurality of authentication servers functions as the home authentication server for all of the one or more tokens in the system. In another embodiment, the high water mark value associated with the token seeking authentication includes information regarding a most recent time the token authenticated to one of the plurality of authentication servers. In yet another embodiment, the adjudicator disregards the high water mark associated with a token if the high water mark has aged by more than a predetermined amount of time. In an embodiment the predetermined amount of time is a function of whether the token is a hardware-based token or a software-based token.

In another aspect, the invention is a method of detecting and preventing replay attacks in an authentication network including a plurality of authentication servers interconnected through an authentication network. The method includes associating a token, that is capable of generating one-time passcodes, with a home authentication server that maintains a current high water mark value of the token seeking authentication. The method also includes generating a one-time passcode with the token, and providing the one-time passcode to one of the plurality of authentication servers for authentication. The method further includes evaluating a high water mark value associated with the token, and allowing an authentication procedure to proceed for the token if the high water mark evaluation indicates that the one-time passcode was not used in a previous authentication transaction. The method also includes preventing authentication of the token seeking authentication if the high water mark evaluation indicates that the one-time passcode was used in a previous authentication transaction.

In another aspect, the invention is a method of associating tokens, capable of generating one-time passcodes, with home authentication servers in a network of authentication servers. The method includes assigning each of a plurality of tokens to a home authentication server according to a predetermined characteristic of the token, and evaluating authentication activity of the plurality of tokens. The method further includes, for each one of the plurality of tokens, reassigning the token to a home authentication server to which the token most often authenticates.

In one embodiment, the predetermined characteristic of the token is a registration site of the token. In another embodiment, the predetermined characteristic of the token is an identification number associated with the token.

In one embodiment, evaluating authentication activity of the plurality of tokens further includes counting authentication attempts the token submits to each authentication server in the network of authentication servers.

Another embodiment further includes reassigning the token at a predetermined token reassignment rate.

One embodiment further includes disregarding the high water mark if the high water mark has aged by more than a predetermined amount of time. In another embodiment the predetermined amount of time is a function of whether the token is a hardware-based token or a software-based token.

In another aspect, a method of determining availability of one or more home authentication servers in a network of authentication servers includes assigning each of a plurality of tokens, capable of generating one-time passcodes, to a home authentication server. The method further includes issuing each of the home authentication servers a status request, receiving status responses from at least some of the home authentication servers, and identifying one or more home authentication servers that fail to provide a status response as failed home authentication servers. For each token that is currently assigned to one of the failed home authentications servers, the method also includes assigning the token to a different home authentication server.

In another aspect, a method of determining availability of one or more home authentication servers in a network of authentication servers includes assigning each of a plurality of tokens, capable of generating one-time passcodes, to a home authentication server. The method also includes detecting, via one or more hardware-based failure detection components, whether one or more of the home authentication servers have failed. For each token that is currently assigned to one of the home authentications servers detected as having failed, the method further includes assigning the token to a different home authentication server.

DETAILED DESCRIPTION

Figure 1:
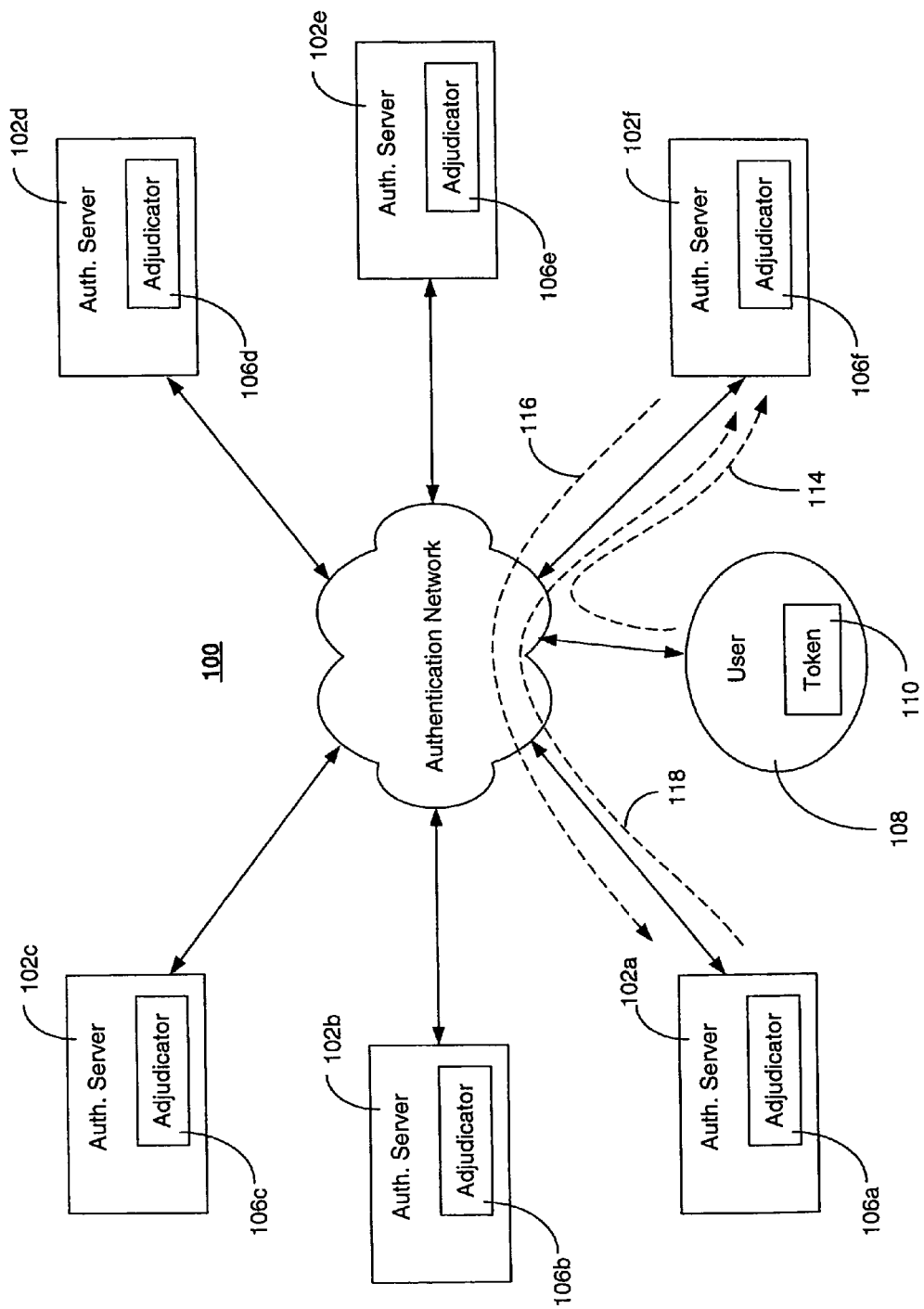
FIG. 1 shows one embodiment of a system for detecting and preventing replay attacks in authentication systems, according to the invention.

The following section describes a novel method of disseminating HWM information among authenticating functions within an authentication system, in order to detect and prevent replay attacks. In the described embodiments, the authenticating functions are referred to as authentication servers, and the one time passcode-generating functions are referred to as tokens, although the use of these terms is not meant to be limiting in any way. For the purposes of this description, an authentication server may be any hardware or software component, or combination thereof, capable of authenticating a user based on a dynamically generated authentication code provided by a passcode-generating function associated with the user. Similarly, a token may be any hardware or software component, or combination thereof, capable of producing a dynamically generated authentication code.

In general, an authentication network constructed and arranged according to described embodiments includes a plurality of authentication servers connected together in an authentication network. Each of the authentication servers includes an adjudicator that participates in the evaluation of the HWM of a token with the time the token provides a passcode for authentication. Each user that is a member of the authentication network has an associated home authentication server. The home authentication server maintains a record of the HWM information for that user's tokens, and all authentication servers in the authentication network know which authentication server is the home for that user.

Each authentication process in the network has an associated adjudication process. A particular authentication process is free to perform the crypto to validate a passcode, but before it sends a success or failure message, that authentication process sends the new HWM information to its local adjudicator and asks if it is acceptable to proceed with the authentication. The local adjudicator determines which adjudicator in the network is the home adjudicator for that token, and sends the new HWM information to the adjudicator requesting validation. The home adjudicator checks if the HWM indicates a replay or not, updates the HWM if the current authentication attempt is not a replay, and then sends a response back to the local adjudicator. The local adjudicator then passes the response back to the originating authentication process. Thus, the adjudication process is somewhat independent from the authentication process.

The utility of the described embodiments lies in the fact that the system is not required to keep all authentication servers up to date with the current HWM of all tokens. Only particular "home" authentication servers maintain the HWM information, and authenticating servers only need to be capable of accessing the proper home server for a particular authentication transaction.

When a user attempts to authenticate to an authentication server using their token, that authenticating server contacts the user's home authentication server to verify the HWM information for the token. The home adjudicator evaluates the HWM information with respect to the current login time and allows the authentication to proceed only if the evaluation indicates that the presented passcode has not been used in a previous transaction.

FIG. 1 shows one embodiment of a system 100 for detecting and preventing replay attacks in authentication systems. The system 100 includes a plurality of authentication servers 102a-102f in communication with one another through an authentication network 104. Each authentication server includes an adjudicator 106a-106f, which evaluates token HWM values as is described in more detail below. A user 108 and an associated token 110 communicate with an authentication server 102a-102f through the network 104 when the user 108 wishes to authenticate to one of the authentication servers in the system. Although only one user, one token, and six authentication servers are shown in this exemplary system, it is understood that the system 100 operates with a plurality of users, tokens and authentication servers, and this description applies to all users, tokens and authentication servers in the system.

The user 108 is associated with a particular authentication server, referred to herein as its "home" server 102a, which maintains a record of the current HWM associated with the token 110. In general, any of the authentication servers 102a-102f may serve as the user's home server, and in fact the home designation for a particular user may migrate to another server as is described in more detail below.

The fact that the user 108 is associated to the home server 102a is known to all of the other authentication servers in the system. Details regarding how this association is disseminated to the other authentication servers in the system are described in more detail below.

In operation, the user 108 initiates an authentication procedure by sending the current passcode provided by the token 110 to an authentication server in the system. In the exemplary system shown in FIG. 1, the user 108 sends a passcode 112 from the token 110 to the authentication server 102f. The authentication server 102f determines that the home server for the user 108 associated with this particular toke 110 is authentication server 102a. The authentication server 102f sends a message to the home server 102a requesting that the home server 102a compare the current authentication request with the HWM. If the comparison indicates that the current authentication request provided by token 110 has been used in a previous transaction, the home server 102a will return a message indicating to authentication server 102f that the authentication should be rejected. If the comparison indicates that the current authentication request provided by token 110 has not been used in a previous transaction, the home server 102a will return a message to authentication server 102f indicating that the authentication should be accepted.

In one embodiment of the invention, the cryptographic validation of the supplied authentication code occurs at the authentication server 102f, rather than at home server 102a. For this embodiment, the only process that occurs at home server 102a is a check of the HWM. This allows the bulk of the cryptographic operations associated with authentication to occur in a distributed manner, while still preventing a replay attack. In another embodiment, both the HWM check and the authentication cryptography are performed at home server 102a. In yet another embodiment, both the HWM check and the authentication code validation occur at the authentication server 102f.

For time-based one time passcodes, an automatic aging occurs due to the fact that the passcode is only valid for a predetermined amount of time. Once the passcode is no longer within this "validity window," the HWM is no longer useful and therefore can be disregarded or deleted. Some embodiments delete the HWM values for passcodes that are no longer in the validity window in order to conserve memory storage space on the home authentication servers.

Home Server Assignment

An important aspect of the described embodiments relates to how users are assigned to a home authentication server, and how information regarding user-to-home server relationships is disseminated to all authentication servers in the network. In one embodiment of the system, all users are assigned to one authentication server (a primary home authentication server) in the network that maintains the HWM information associated with each token in the system, and verifies the HWM information on behalf of the other authentication servers upon request. In this embodiment, the system may also assign a "hot backup" home authentication server (i.e., a different authentication server in the system) that maintains the same HWM information as the primary home authentication server. In the event of a failure of the primary home authentication server, the hot backup authentication server takes over the HWM maintenance and dissemination functions.

The use of a primary home authentication server (and possibly a hot backup server) is the simplest technique for maintaining and disseminating HWM information. This technique is used primarily for small, localized authentication networks. As the number of tokens increases and the authentication servers become more widely distributed, remotely located authentication servers may incur a processing delay due to transit delays in accessing the home authentication server. An inherent fixed bias exists for tokens authenticating to the home authentication server, since the local adjudicator does not incur a transit delay when accessing the HWM information.

In one or more embodiments, home authentication servers are distributed throughout the entire authentication system. In other words, two or more of the authentication servers in the system serve as home authentication servers for storing and validating HWM information. In these embodiments, the maintenance and validation of HWM information is balanced among the two or more home authentication servers, so that none of them bears a burden significantly greater than the other home authentication servers.

In one embodiment, users are evenly distributed among the home authentication servers, so that each home authentication server is responsible for storing and validating the HWM information of an equal or near equal number of tokens. An administration function within the system (located for example with a particular authentication server) monitors the user load for each home authentication server. When a new user is added to the system, the administration function assigns the user to a home authentication server according the relative load distribution, so as to maintain an even distribution.

In another embodiment, users are assigned to home authentication servers according to geographic location of the user. For example, a user may be assigned to the home authentication server that is geographically closest to the site where the user was registered. This assignment may be performed manually or it may be done automatically by an administration function in cooperation with the registration process.

In another embodiment, the initial user home assignment may be dynamically updated according to which authentication server the user most often authenticates. Such an adaptive authentication system continuously tracks and migrates the user-to-home authentication server association. The adaptive system increases system performance efficiency because HWM adjudication occurs locally, thereby avoiding transit delays of HWM information between authentication servers.

Failover

Another important aspect of the described embodiments relates to how the system handles a failure of a home authentication server. In one embodiment, for each home authentication server, the system maintains a prioritized list of alternate home authentication servers to be accessed in the event that home authentication server fails. This prioritized list may be maintained on an arbitrary one of the authentication servers, or it may be maintained as a distributed function across the entire network.

In one embodiment, the prioritized list of alternate home authentication servers is based on some characteristic of the IP addresses of the servers. For example, each server may be represented by the numerical value of its IP address and prioritized in ascending (or descending) order according to that value. Or, each server may be represented by the numerical value of the sum of the IP address field, and likewise prioritized in ascending (or descending) order. Other permutations of the IP address may also be used.

In another embodiment, the prioritized list of alternate home authentication servers is based on how busy each home authentication server is relative to the other home authentication servers. In this embodiment, the prioritized list changes dynamically depending on load variations across the system, thereby maintaining an even load across the home authentication servers. The variation rate of the list (i.e., the user reassignment rate) may be limited by some amount (for example, to one change per hour), to reduce the processing necessary to maintain the list.

When a home authentication server fails, the HWM information for all of the tokens that are associated with that server is lost. Thus, in the transition time during which the next alternate home authentication server has no current HWM information for its adopted tokens, the new home authentication server cannot provide meaningful HWM information to requesting authentication servers. In one embodiment, the next alternate home authentication server on the prioritized list provides, upon request, HWM information that is certain to allow authentication. In this embodiment, the system concedes performance degradation by allowing potentially improper authentications.

In another embodiment, the next alternate home authentication server on the prioritized list provides, upon request, HWM information that is certain to deny authentication. In this embodiment, the system concedes performance degradation by denying potentially proper authentications.

In one embodiment, a failed home authentication server is detected only when a user attempts to authenticate to that server. In other embodiments, authentication servers periodically send status request messages (e.g., "hello" messages) to one another as background communications to evaluate the status of the system. This embodiment has the advantage of being able to identify a failed authentication server outside of the normal authentication process, thereby reducing the probability that a user will be denied authentication due to a time out failure.

In at least one embodiment, the system handles a failed home authentication server by using hardware fault-handling techniques and components such as load-handling devices and DNS servers. Such hardware fault-handling techniques are useful when the entire hardware configuration of the authentication is known and controlled. In one embodiment, active DNS servers detect, at the hardware level, when an authentication server has failed, and redirects authentication traffic to another server. Similarly, the hardware fault-detection devices implement a prioritized alternate home authentication server list, and redirect adjudicating functions to other home servers for HWM information. Such hardware-level fault detection components eliminate the need for status check communications (e.g., hello messages) between authentication servers on the network.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for detecting and preventing replay attacks in an authentication network, comprising:
   a plurality of authentication servers interconnected through an authentication network;
   one or more tokens for generating a one-time passcode, and for providing the one-time passcode to one of the plurality of authentication servers for authentication;
   an adjudicator function associated with each of the plurality of authentication servers, wherein the adjudicator function:
   (a) evaluates a high water mark value associated with a token seeking authentication;
   (b) allows an authentication procedure to proceed for the token seeking authentication if the high water mark evaluation indicates that the one-time passcode was not used in a previous authentication transaction; and,
   (c) prevents authentication of the token seeking authentication if the high water mark evaluation indicates that the one-time passcode was used in a previous authentication transaction;
   wherein the token seeking authentication is associated with a home authentication server that maintains a current high water mark value of the token seeking authentication, and wherein the home authentication server validates the current high water mark value on behalf of the adjudicator function evaluating the token seeking authentication;
   wherein, when the token seeking authentication seeks authentication from an authentication server of the plurality of authentication servers that is not the home authentication server (non-home authentication server), the system is constructed and arranged to:
   (i) forward the high water mark value to the adjudicator function of the non-home authentication server;
   (ii) determine, at the adjudicator function of the non-home authentication server, that the high water mark information originating from the token seeking authentication is associated with the home authentication server; and
   (iii) in response to determining, send the high water mark value to the adjudicator function of the home authentication server; and
   wherein, when the token seeking authentication seeks authentication from the home authentication server, the system is constructed and arranged to:
   (i) forward the high water mark value to the adjudicator function of the home authentication server;
   (ii) determine, at the adjudicator function of the home authentication server, that the high water mark value originating from the token seeking authentication is associated with the home authentication server; and
   (iii) in response to determining, maintain the high water mark value in the adjudicator function of the home authentication server.

2. The system of claim 1, wherein one of the plurality of authentication servers functions as the home authentication server for all of the one or more tokens in the system.

3. The system of claim 1, wherein the high water mark value associated with the token seeking authentication includes information regarding a most recent time the token authenticated to one of the plurality of authentication servers.

4. The system of claim 1, wherein the adjudicator disregards the high water mark associated with a token if the high water mark has aged by more than a predetermined amount of time.

5. The system of claim 4, wherein the predetermined amount of time is a function of whether the token is a hardware-based token or a software-based token.

6. The system of claim 1:
wherein, when the token seeking authentication seeks authentication from the non-home authentication server, the system is further constructed and arranged to:
 (iv) perform cryptographic calculations associated with authenticating the one-time passcode at the non-home authentication server; and
wherein, when the token seeking authentication seeks authentication from the home authentication server, the system is further constructed and arranged to:
 (iv) perform cryptographic calculations associated with authenticating the one-time passcode at the home authentication server.

7. A method of associating tokens, capable of generating one-time passcodes, with home authentication servers in a network of authentication servers, comprising:
assigning each of a plurality of tokens to a home authentication server according to a predetermined characteristic of the token;
evaluating authentication activity of the plurality of tokens;
for each one of the plurality of tokens, reassigning the token to a home authentication server to which the token most often authenticates;
wherein authentication activity includes, regardless of which authentication server in the network of authentication servers that a token seeks authentication from, evaluating a high water mark value associated with the token seeking authentication at the home authentication server;
wherein evaluating the high water mark value includes, when the token seeking authentication seeks authentication from an authentication server of the plurality of authentication servers that is not the home authentication server (non-home authentication server):
 (i) forwarding the high water mark value to the adjudicator function of the non-home authentication server;
 (ii) determining, at the adjudicator function of the non-home authentication server, that the high water mark information originating from the token seeking authentication is associated with the home authentication server; and
 (iii) in response to determining, sending the high water mark value to the adjudicator function of the home authentication server; and
wherein evaluating the high water mark value includes, when the token seeking authentication seeks authentication from the home authentication server:
 (i) forwarding the high water mark value to the adjudicator function of the home authentication server;
 (ii) determining, at the adjudicator function of the home authentication server, that the high water mark value originating from the token seeking authentication is associated with the home authentication server; and
 (iii) in response to determining, maintaining the high water mark value in the adjudicator function of the home authentication server.

8. The method of claim 7, wherein the predetermined characteristic of the token is a registration site of the token.

9. The method of claim 7, wherein the predetermined characteristic of the token is an identification number associated with the token.

10. The method of claim 7, wherein evaluating authentication activity of the plurality of tokens further includes counting authentication attempts the token submits to each authentication server in the network of authentication servers.

11. The method of claim 7, further including reassigning the token at a predetermined token reassignment rate.

12. The method of claim 7, further including disregarding the high water mark if the high water mark has aged by more than a predetermined amount of time.

13. The method of claim 12, wherein the predetermined amount of time is a function of whether the token is a hardware-based token or a software-based token.

14. The method of claim 7:
wherein evaluating the high water mark value further includes, when the token seeking authentication seeks authentication from the non-home authentication server:
 (iv) performing cryptographic calculations associated with authenticating the one-time passcode at the non-home authentication server; and
wherein evaluating the high water mark value further includes, when the token seeking authentication seeks authentication from the home authentication server:
 (iv) performing cryptographic calculations associated with authenticating the one-time passcode at the home authentication server.

15. A method of detecting and preventing replay attacks in an authentication network including a plurality of authentication servers interconnected through an authentication network, comprising:
associating a token, capable of generating one-time passcodes, with a home authentication server that maintains a current high water mark value of the token seeking authentication;
generating a one-time passcode with the token, and providing the one-time passcode to one of the plurality of authentication servers for authentication;
evaluating a high water mark value associated with the token;
allowing an authentication procedure to proceed for the token if the high water mark evaluation indicates that the one-time passcode was not used in a previous authentication transaction;
preventing authentication of the token seeking authentication if the high water mark evaluation indicates that the one-time passcode was used in a previous authentication transaction;
when the token seeking authentication seeks authentication from an authentication server of the plurality of authentication servers that is not the home authentication server (non-home authentication server):
 (i) forwarding the high water mark value to an adjudicator function of the non-home authentication server;
 (ii) determining, at the adjudicator function of the non-home authentication server, that the high water mark information originating from the token seeking authentication is associated with the home authentication server; and
 (iii) in response to determining, sending the high water mark value to an adjudicator function of the home authentication server; and when the token seeking authentication seeks authentication from the home authentication server:
- (i) forwarding the high water mark value to the adjudicator function of the home authentication server;
- (ii) determining, at the adjudicator function of the home authentication server, that the high water mark value originating from the token seeking authentication is associated with the home authentication server; and
- (iii) in response to determining, maintaining the high water mark value in the adjudicator function of the home authentication server.

16. The method of claim 15, further comprising:
when the token seeking authentication seeks authentication from the non-home authentication server:
- (iv) performing cryptographic calculations associated with authenticating the one-time passcode at the non-home authentication server; and when the token seeking authentication seeks authentication from the home authentication server:
- (iv) performing cryptographic calculations associated with authenticating the one-time passcode at the home authentication server.

* * * * *